Jan. 20, 1970    L. A. LEDGETT    3,490,655
MATERIAL BLENDING SILO
Filed Aug. 17, 1966    2 Sheets-Sheet 1
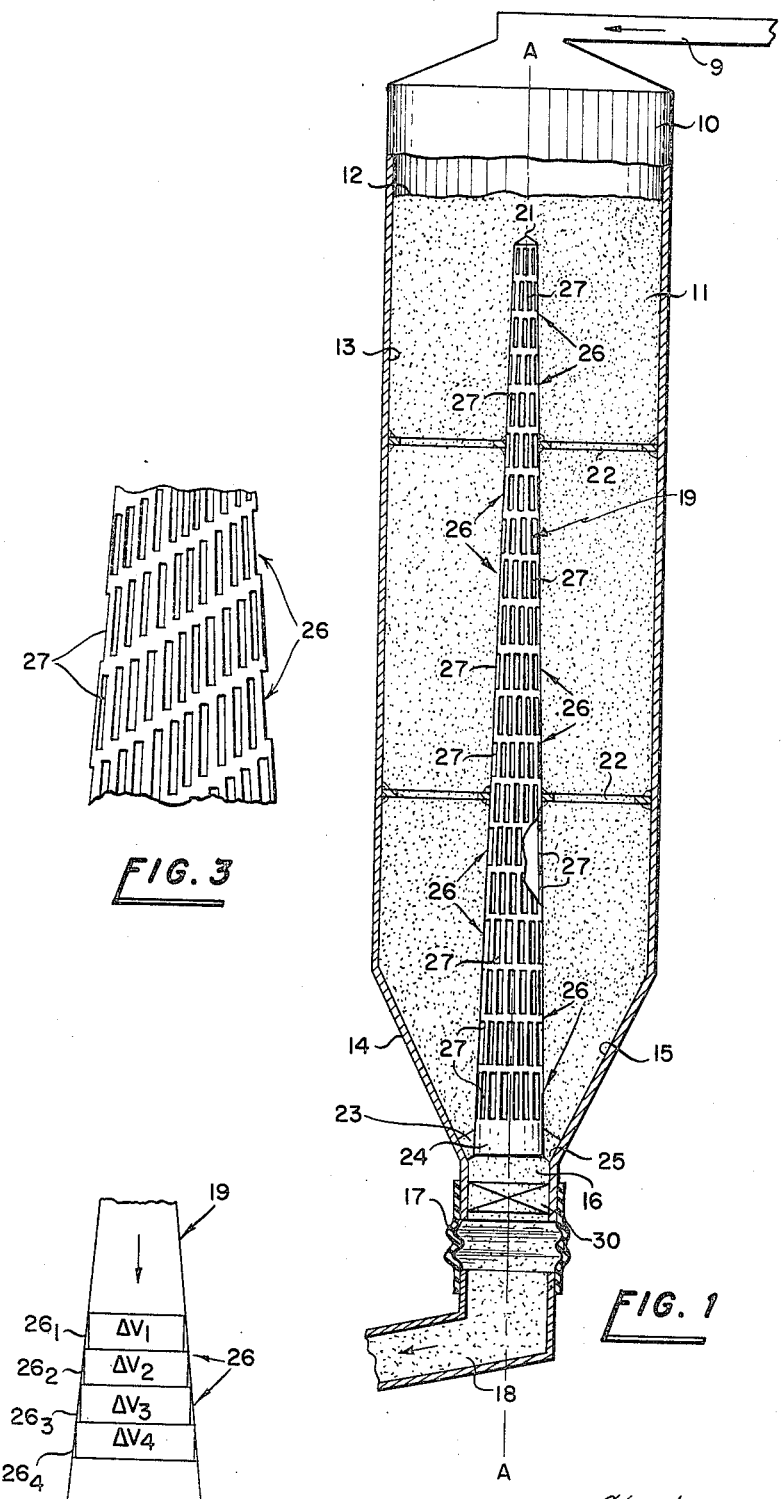
INVENTOR
Lowell A. Ledgett
BY
ATTORNEYS

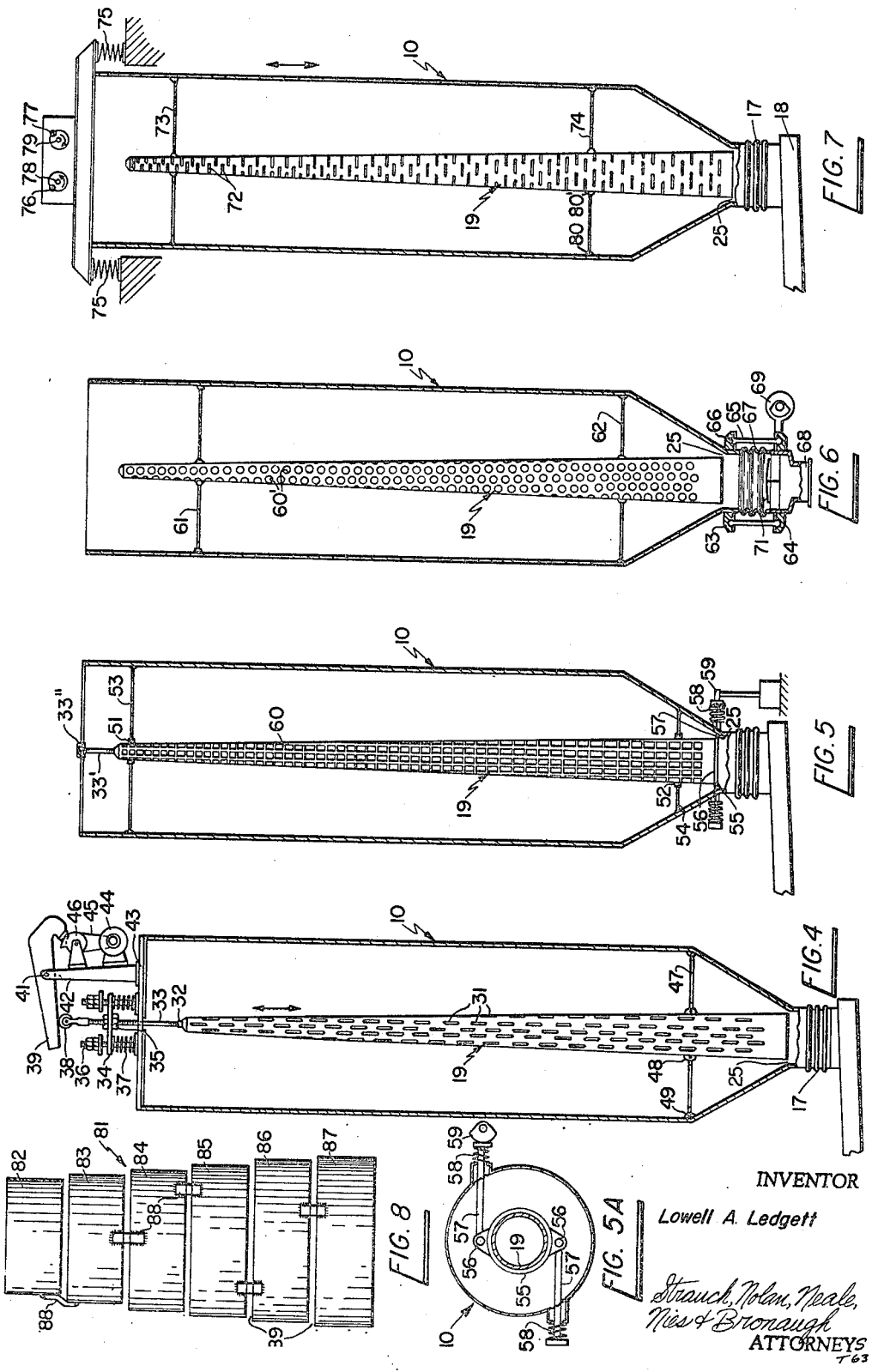

United States Patent Office  3,490,655
Patented Jan. 20, 1970

3,490,655
MATERIAL BLENDING SILO
Lowell A. Ledgett, Ridgewood, N.J., assignor to Colgate-Palmolive Company, New York, N.Y., a corporation of Delaware
Filed Aug. 17, 1966, Ser. No. 573,012
Int. Cl. B65g *3/12, 65/70;* B67d *5/60*
U.S. Cl. 222—196                                    15 Claims

ABSTRACT OF THE DISCLOSURE

A dispensing receptacle for powdered or granular material has a top inlet and a bottom discharge opening and a hollow conical discharge control shell is mounted within the vessel surrounded by said material with its open lower end at said opening. Side wall apertures are formed in the shell wall arranged to provide progressively downwardly increasing aperture area for admitting added increments of said material by gravity flow into the downwardly moving stream of material within the shell at progressively lower levels so that material from said levels is blended within the shell to contain material that is representative of the average composition of the entire mass. The vessel or the shell may be vibrated to promote flow of the material.

---

This invention relates to a method and apparatus for controlling the discharge of dry powdered or granular material from a storage or like vessel and is particularly concerned with arrangements whereby the discharged material is accurately representative of average characteristics of the mass of material within the vessel. Still more particularly the invention is concerned with arrangements whereby material from different levels is substantially simultaneously discharged at the vessel outlet.

Conventionally, fluent dry material in powdered or granular form, such as detergent or soap particles, is stored in a large vessel from which it is withdrawn by gravity flow as needed through a controlled discharge aperture at the center of the bottom of the vessel. Invariably most of the unsupported material column directly above that aperture discharges first, followed by the outer surrounding layers. This sometimes results in non-uniform discharge but, more important, where the material may have different densities or like characteristics at different vertical levels in the vessel, due to "pour spill" segregation of non-homogeneous material or different superposed batches introduced as the vessel is filled, the discharged material does not represent the average density or the like of the stored material.

The present invention provides a novel method and apparatus whereby gravity flow of material from different vertical levels in such apparatus is controllably blended to provide at the discharge outlet a continuous uniform flow of material that is representative of the average characteristics of the stored material, and it is a major object of this invention to provide such method and apparatus.

Another object of the invention is to provide a novel storage vessel construction from which granular or powdered material is withdrawn by gravity flow wherein material from substantially all levels within the vessel is blended during discharge.

A further object of the invention is to provide a novel method and structural arrangement for controlling gravity flow of powdered or granular material from a storage vessel wherein an apertured hollow open bottom tube of progressively downwardly increasing volume is enclosed within the vessel and is such that the relationship between the area of the apertures and the incremental increase in volume within the shell at any particular level provides substantially equal flow of the material into the tube at all levels whereby the material entering at said levels is blended in a predetermined manner when discharged at the lower end of the tube.

A further object of the invention is to provide a novel method and apparatus for controlling gravity flow of powdered or granular material from a storage vessel wherein a laterally apertured hollow open bottom tube within the vessel substantially submerged within the material provides regions of downwardly increasing flow area promoting controlled lateral flow of the material into the tube at all levels whereby the material entering at said levels is blended in a predetermined manner when discharged at the lower end of the tube.

A further object of the invention is to provide a novel structure for controlling gravity flow of powdered or granular material from a storage vessel wherein an apertured side wall hollow open bottom material blending tube of progressively downwardly increasing volume is submerged in the material within the vessel, and means is provided for vibrating and/or relatively moving the tube and/or vessel for contributing to material flow through the apertures in the tube wall. Pursuant to this object the tube may be vibrated or oscillated within the vessel, or the vessel may be vibrated.

A further object of the invention is to provide a novel arrangement for controlled discharge of powdered or granular material from a storage or like vessel wherein a tube in the form of a hollow cone is mounted centrally within the vessel with its open lower end aligned with the discharge outlet of the vessel and the cone wall is apertured to provide for simultaneous uniform flow thereinto and blending of material from substantially all levels within the vessel.

Further objects of the invention will appear as the description proceeds in connection with the appended claims and the annexed drawings wherein:

FIGURE 1 is a side elevation partly broken away and in section illustrating the invention according to a preferred embodiment;

FIGURE 2 is a diagrammatic view illustrating the incremental increase in volume within the central hollow tube (differences between $\Delta V_1$, $\Delta V_2$, $\Delta V_3$ ... $\Delta V_n$) which allows lateral flow of material through apertures into the tube during normal operation;

FIGURE 3 is a fragmentary side elevation showing another arrangement of the tube wall apertures;

FIGURE 4 is a side elevation similar to FIGURE 1 although somewhat more diagrammatic and showing the hollow apertured material flow central tube as suspended for controlled vibratory movement;

FIGURE 5 is a fragmentary side elevation like FIGURE 4 but showing the hollow tube vibrated in a different manner;

FIGURE 5A is a section in plan view showing the means for oscillating the tube;

FIGURE 6 is another fragmentary side elevation showing the vessel as having a vibratory bottom;

FIGURE 7 is a fragmentary side elevation showing a vibrator attached to the vessel wall; and FIGURE 8 diagrammatically shows in side elevation an optional tube structure.

In its preferred embodiment the invention comprises a relatively elongated vertical axis uniform cross section or slightly diverging downward storage bin or vessel 10 that is open or connected at the top to receive dry fluent material 11 usually in powdered or granular form and maintain a level substantially as indicated at 12. For example, this level may be continuously maintained by particulate detergent product emerging from a product processing tower to a supply conduit 9. Vessel 10 is an upright smooth interior shell with circular cross-section about its axis A—A and either cylindrical or slightly conical with cross-section increasing downward to relieve hang-up of material on vessel wall above bottom convergence to outlet which can be made as live bottom by vibration or oscillatory motion.

At its lower end vessel 10 may be of gradually reduced cross-section, preferably the conical form indicated at 14, having a smooth conical surface 15 symmetrical about axis A—A, terminating in an opening 16 to which is attached a flexible conduit 17 leading to a takeaway conveyor assembly 18 which may be a vibrating type (not shown) or other suitable type for controlled outflow of material.

Supported suitably within vessel 10 is a blending tube 19 in the form of a hollow cone closed at its upper small end at 21. Tube 19 is relatively thin-walled, preferably fabricated from any suitable material such as metal of adequate thickness to maintain its shape during operation, and it is disposed coaxially with axis A—A. The suspension of tube 19 may be rigid so that the tube is immovable within the vessel as by one or more thin armed spiders such as indicated at 22 and 23 which offer no resistance to downward displacement of the material within vessel 10. Such spiders 22 and 23 are suitably fixed as by welding their inner and outer peripheries to the shell 19 and vessel 10 respectively. Alternatively tube 19 may be suitably mounted with the vessel for controlled vertical or rotational oscillation by suitable means when necessary or desirable to promote flow of material as will be seen.

With tube 19 suitably mounted in either arrangement, its larger open lower end 24 is disposed adjacent and within opening 16 so as to define with the adjacent surrounding wall of the vessel an annular discharge opening 25 that is symmetrical about axis A—A and which surrounds the central discharge opening provided by the open lower end of tube 19.

The wall of tube 19 may be formed at different levels generally indicated at 26 with circumferentially spaced openings 27 each of which is preferably in the form of a rectangular slot. All of the openings 27 may be of the same size and shape, although as will appear the relative sizes and the shapes may be varied as between the groups 26 to suit different materials and different flow characteristics.

Alternatively, the openings 27 could be suitably located horizontally extending slots or, as shown in FIGURE 3, could be arranged in a spiral around the conical wall of the tube. Any arrangement of these slotted openings can be selected which will develop the best flow pattern for the particular material being handled and/or for the particular configuration of the vessel and tube.

In FIGURES 1 and 3 the numeral 26 essentially arbitrarily indicates vertical levels, rather than separate groups of openings 27.

The total area of openings 27 at each level 26 is sufficient to assure free flow of material and keep the tube 19 full as its volume progressively increases downwardly. Preferably, there is provided the largest number of openings 27 that can be made while maintaining the tube walls self supporting.

Thus, when the valve 30 is open or other suitable means employed to control flow through opening 16 is actuated, material 11 discharges by gravity through annular opening 25 and also through tube openings 27 and the interior of shell 19, the combined downward flows passing through discharge openings 16 into the conveyor at 18 which takes material away at a desired rate.

As shown diagrammatically in FIGURE 2, tube 19 has successively lower aperture levels of successively increased area arbitrarily indicated at $26_1$, $26_2$, $26_3$. As illustrated, the volume of material $\Delta V_1$ flowing past and through the apertures of level $26_1$ into the interior of tube 19 at that level will fall downwardly toward the level surrounded by the apertures of level $26_2$ but since the volume $\Delta V_1$ is smaller than the available volume of space $\Delta V_2$ at the level of aperture level $26_2$ there will be a lateral flow of material through apertures $26_2$ to join the material falling within the tube, and this relationship holds true for all of the levels 26 of apertures indicated on the tube in FIGURES 1 and 3.

The foregoing arrangement provides therefore the simultaneous lateral inward flow of material 11 throughout the length of conical tube 19. As each volume increment moves downwardly by gravity within the tube 19 it does not fully occupy the available space immediately below it, and so some material is permitted to flow laterally through apertures 27 into the tube filling available space at each level. Thus, the invention provides continual and simultaneous flow of the granular or powdered material into the interior of tube 19 along the height of the tube. Thus, material from substantially all levels of the column within vessel 10 is blended in the material that flows through discharge opening 16.

Should the material 11 within the vessel be of different density or composition at different vertical levels, due for example to changes in material supplied or classification of material during filling of the vessel, the invention essentially extracts material from all levels, and the combined material being discharged at opening 16 is more nearly uniform and representative of the average composition and/or density of the stored material than material drawn off solely from the bottom. This is of great advantage where the material is being conveyed at 18 to be incorporated in a process such as packaging in which weight for a given volume and composition of contents depend upon uniformity of the supplied materials.

In addition to the foregoing uniform composition, the invention provides for steady downward movement of material throughout the vessel 10, whereas conventional discharge from the bottom leads to "rat holing" where the central core of material discharges first followed by sliding and spilling of the surrounding material. The provision of annular opening 25 at the bottom of the main column of material prevents any material from being trapped within the vessel and thus downward movement of all material within the vessel.

The size and shape of openings 27 are determined as by test to best suit the gravity feeding of materials of different characteristics. Alternatively, openings 27 may be of different size and number at different levels, but the total area relationships prevail. In one embodiment a vessel 10 of relatively small size has a product level height about three to five times its diameter, while the conical wall of a ten foot long tube 19 should not be less than about six inches in diameter at the top and increase in diameter about ten percent per foot, reaching a twelve inch diameter at the bottom.

FIGURES 4, 5, 6 and 7 show the tube 19 arranged within vessel 10 formed with different types of wall apertures and arranged for different types of relative movement with respect to the vessel 10.

In FIGURE 4, vessel 10 is essentially the same as FIGURE 1 and fixedly mounted. The conical tube 19 is shown as having staggered openings 31 along its entire length and the upper end of tube 19 is attached at 32 to the lower end of a centered vertical threaded rod 33 adjustably fixed to a plate 34 as by nuts 35. Plate 34 is guided and confined for limited vertical reciprocation by posts 36 supported by springs 37 that bias plate 34 upwardly. The upper end of rod 33 carries a roller 38 engaging a lever 39 pivoted at 41 on a bracket 42 fixed to the upper end of the vessel at 43. Bracket 42 supports a motor 44 connected by belt 45 to drive a rotatable cam 46 engaged with lever 39.

The lower end of tube 19 is flexibly connected to the vessel wall by a plurality of radial struts 47 that are pivoted at 48 and 49 respectively to the tube and vessel to permit limited vertical oscillation of tube 19 relative to vessel 10.

Rod 33 passes freely through the upper end of vessel 10, so that in effect tube 19 is suspended from plate 34, and when motor 44 is driven cam operated lever 39 and springs 37 combine to produce periodic vertical oscillation of tube 39 within the material surrounding it, thus promoting flow of the material into the tube.

In the embodiment of FIGURE 5, tube 19 is mounted and supported for oscillation about its vertical axis. It is preferably suspended by rod 33' from a rotation permitting socket 33" in the top wall of the vessel. Tube 19 is centered by supporting spiders 53 and 54 respectively secured to the vessel wall. Tube 19 is connected to these spiders by resilient sockets 51 and 52 that permit restricted twisting of the tube about its axis. Affixed around the lower end of tube 19 adjacent annular space 25 is a ring 55 having diametrically opposite ears pivotally connected at 56 to parallel rods 57 that are oppositely outwardly spring biased at 58. One rod 57 is engaged by motor driven cam 59 so that when the cam 59 is driven rods 56 are reciprocated back and forth to oscillate tube 19 about its vertical axis. This arrangement permits small amplitude oscillations, and other equivalent arrangements may be used to produce larger amplitude oscillations as desired. Depending on material flow characteristics, the most effective amplitude and frequency may be arrived at to promote material flow through the openings 60 which are here shown as in generally grid-like formation.

FIGURE 6 shows another embodiment wherein the tube 19 having circular openings 60' is fixed within the vessel 10 as by upper and lower spiders or struts 61 and 62. At its lower end vessel 10 here has a sturdy collar 63 secured thereto, and a similar concentric collar 64 is suspended from collar 63 by a series of circumferentially distributed vertical links 65 that have universal socket connections 66 at both ends to the collars. A flexible conduit 67 interconnects the collars, and a discharge spout 68 is secured to collar 64. A motor driven eccentric vibrator unit 69 is operably connected to collar 64 so that during operation the suspended lower portion of the vessel is vibrated to promote material flow. A baffle plate 71 is mounted over the discharge opening so that material flow will stop when material flow is stopped. This provides controlled discharge of the granular material, and other equivalent discharge control means may be employed for the purpose.

In the FIGURE 6 embodiment, by providing an eight foot diameter live bottom at 66–68 below the bottom of an apertured blending tube 19 of the same lower end diameter in vessel 10 about sixteen to twenty feet in diameter and a twelve to fourteen inch diameter discharge spout at 68, a relatively high material discharge rate of 20,000–40,000 pounds per hour can be obtained using a tube thirty feet high with the upper closed end of the tube about one foot in diameter.

FIGURE 7 shows another form of the invention wherein the tube 19 having side wall openings 72 in the form of staggered horizontal slots is mounted within the vessel 10 by upper and lower spiders 73 and 74. The upper end of vessel 10 is flexibly suspended as by springs 75 on rigid support means. Vertical oscillation is imparted to vessel 10 by oppositely rotating horizontally balanced but vertically unbalanced weights 76 and 77 on motor driven shafts 78 and 79. Spiders 73 and 74 may be fixed to the tube and vessel, or may be flexibly connected to either or both as at 80 and 80' for relative motion between the tube and vessel when the vibrator is driven.

In all the embodiments of FIGURES 4–7 the material is suitably fed into the vessel upper end as in FIGURE 1, and preferably in a manner to accomplish uniform distribution for a fairly level surface thus avoiding cone pile "pour spill" segregation and also yielding maximum utilization of the vessel volume for material storage.

FIGURE 8 shows a different structure that may be used for the hollow tube within the vessel. Here tube 81 is made of a series of concentric cylindrical sections 82–87 of downwardly increasing diameter, rigidly secured to each other in slightly vertically spaced relation as by welded on brackets 88. The spaces 89 between the upper and lower edges of adjacent cylindrical sections are of downwardly increasing size to provide for uniform flow of material into the tube interior, at the various levels, as in the other embodiments.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for continuously blending dry fluent material from substantially all vertical levels of a laterally confined mass of said material comprising an upright vessel for containing said mass of material, generally conical perforated tubular means mounted within said vessel with the larger end thereof positioned at the lower end of said vessel, said generally conical perforated tubular means forming and guiding a continuously downwardly moving stream of said material progressively downwardly increased in volume by simultaneous gravity flow thereinto of additional material at the different levels, and means discharging said stream at the lower end of said vessel, said discharged stream consisting of material that is substantially representative of the average composition of the entire mass.

2. The apparatus defined in claim 1, wherein said stream forming means is a laterally apertured conical tube imbedded within said material and having an open lower discharge end.

3. In the apparatus defined in claim 1, said stream forming and guiding means comprising a generally conical tubular structure imbedded within said material, said structure having side wall aperature means at said different levels to permit flow of said material into said structure, said aperture means progressively increasing in area toward the lower end of said mass.

4. In combination, an upright vessel adapted to contain a mass of powdered or granular material and having a bottom discharge opening, means for introducing material at the upper end of said vessel, a generally conical tubular discharge control member mounted within the vessel surrounded by said material, said generally conical tubular member having its larger open lower end associated with said opening and having horizontally and vertically distributed side wall apertures so constructed and arranged as to provide substantially continuous gravity flow of said material into said member substantially simultaneously at the different levels of said material in the vessel whereby material from said levels is blended within said member into a downwardly moving stream containing material that is representative of the average composition of the entire mass.

5. In the combination defined in claim 4, said member being a thin walled hollow uniformly tapered conical tube mounted within said vessel.

6. In the combination defined in claim 4, said vessel having a cross-section wall substantially symmetrically surrounding said material, and said member being a hollow conical tube mounted within the vessel, said apertures being formed in the tube wall and being arranged to provide progressively downwardly increasing aperture area for admitting added increments of said material by gravity flow into said moving stream at progressively lower levels.

7. In the combination defined in claim 4, said tubular member defining an annular passage between the lower end thereof and the vessel in communication with said discharge opening.

8. In the combination defined in claim 7, said annular passage and the lower end of said member discharging material into said vessel discharge opening at substantially the same level.

9. In the combination defined in claim 6, the lower end of said vessel surrounding the lower end of said conical tube being of gradually reducing cross section so that a relatively narrow annular passage is formed between the tube and vessel just above said discharge opening.

10. In the combination defined in claim 4, means for relatively moving said member and said vessel to promote flow of said material toward said discharge opening.

11. In the combination defined in claim 10, means mounting said member for controlled periodic movement within the surrounding material.

12. In the combination defined in claim 11, said mounting means comprising means flexibly suspending said member within the vessel and means for periodically moving said member.

13. In the combination defined in claim 10, means mounting said member for movement about its vertical axis, and means for periodically oscillating said member about said axis.

14. In the combination defined in claim 10, means for vibrating said vessel.

15. In the combination defined in claim 4, means providing a flexibly mounted bottom section of said vessel at said discharge opening, and means for periodically vibrating said bottom section to promote material flow.

References Cited

UNITED STATES PATENTS

| | | | |
|---|---|---|---|
| 66,661 | 7/1867 | Williams | 222—564 X |
| 2,174,348 | 9/1939 | Damond | 222—196 |
| 2,433,684 | 12/1947 | Damond | 222—196 X |
| 2,779,510 | 1/1957 | Wilson et al. | 222—196 X |
| 2,805,802 | 9/1957 | Strong | 222—564 |
| 3,029,986 | 4/1962 | Horn et al. | 222—564 X |
| 3,076,582 | 2/1963 | Arcement | 222—464 |
| 3,094,243 | 6/1963 | Haugen | 222—464 X |
| 3,201,010 | 8/1965 | Werner | 222—464 |
| 2,907,501 | 10/1959 | Laird | 222—564 X |

ROBERT B. REEVES, Primary Examiner

F. R. HANDREN, Assistant Examiner

U.S. Cl. X.R.

222—464, 564